(12) United States Patent
Gehtman et al.

(10) Patent No.: US 12,238,225 B2
(45) Date of Patent: Feb. 25, 2025

(54) UNAUTHORIZED COMMUNICATION DETECTION IN HYBRID CLOUD

(71) Applicant: Dell Products, L.P., Round Rock, TX (US)

(72) Inventors: Yevgeni Gehtman, Modi'in (IL); Tomer Shachar, Omer (IL); Maxim Balin, Gan-Yavne (IL)

(73) Assignee: Dell Products, L.P., Round Rock, TX (US)

( * ) Notice: Subject to any disclaimer, the term of this patent is extended or adjusted under 35 U.S.C. 154(b) by 545 days.

(21) Appl. No.: 17/659,392

(22) Filed: Apr. 15, 2022

(65) Prior Publication Data

US 2023/0336363 A1  Oct. 19, 2023

(51) Int. Cl.
*H04L 9/32* (2006.01)
*H04L 61/4511* (2022.01)
*H04L 61/5014* (2022.01)

(52) U.S. Cl.
CPC .......... *H04L 9/3249* (2013.01); *H04L 9/3242* (2013.01); *H04L 61/4511* (2022.05); *H04L 61/5014* (2022.05)

(58) Field of Classification Search
CPC ............... H04L 9/3249; H04L 61/5014; H04L 61/4511; H04L 9/3242
USPC .......................................................... 713/168
See application file for complete search history.

(56) References Cited

U.S. PATENT DOCUMENTS

| | | | |
|---|---|---|---|
| 11,743,047 B2* | 8/2023 | Rahn | H04L 9/3213 713/156 |
| 2020/0133690 A1* | 4/2020 | Qi | G06F 21/12 |
| 2020/0153798 A1* | 5/2020 | Liebherr | H04L 67/563 |
| 2023/0129306 A1* | 4/2023 | Savage | H04L 9/3226 713/156 |
| 2023/0239165 A1* | 7/2023 | Young | H04L 9/3265 713/175 |
| 2023/0342467 A1* | 10/2023 | Gehtman | G06F 21/577 |

* cited by examiner

*Primary Examiner* — Dereena T Cattungal
(74) *Attorney, Agent, or Firm* — Fogarty LLP

(57) ABSTRACT

Systems and methods are disclosed for detecting nonlegitimate communications in a hybrid cloud system. An example method comprises receiving a request from a service on a public cloud platform, calculating a unique signature for the service, and verifying the calculated unique signature against a local signature table on the public cloud platform. If the calculated unique signature is verified, then the calculated unique signature is sent to a security signature service on a private cloud platform. If the calculated unique signature is also verified against a global signature table on the private cloud platform, then a response to the request is received from the security signature service.

13 Claims, 8 Drawing Sheets

UNAUTHORIZED COMMUNICATION DETECTION IN HYBRID CLOUD

FIELD

The present invention relates to the field of information technology, including, more particularly, to systems and techniques for providing secure access to applications across different platforms or cloud computing environments.

BACKGROUND

Cloud computing generally refers to Internet-based computing, whereby shared server resources, software, and information are provided to client devices on demand. The server resources, for example, include data storage, processing capabilities, and network bandwidth. The resources are often scalable and virtualized, so that details of resource provisioning are hidden from the cloud computing consumers, who no longer have need for expertise in, or control over, the technology that provides the shared server resources.

Cloud application platforms provide facilities for running applications on cloud computing infrastructures, and providing security, control and compliance over the applications and data in cloud computing infrastructure. For example, a cloud application platform may provide facilities for creating multi-tenant virtual datacenters that are decoupled from the underlying hardware and isolated from one another. The virtual datacenters are exposed to users through an Internet-based portal and the users are provided with access to services that are deployed within the virtual datacenter. Applications and data can be segmented into trusted zones and security policies can be implemented and monitored. Virtual datacenters, such as Microsoft Azure, Amazon AWS, Google CLOUD, Dell Technologies Cloud, etc., that are available to any user are referred to as a public cloud.

Private clouds emulate cloud computing on private networks by hosting virtual machines on servers in the private networks, which are typically hosted on premises by an enterprise. Private clouds provide the benefits of sharing hardware costs for utility computing, the ability to recover from failure, and the ability to scale up or down depending upon demand. Private cloud users, however, still have to buy, build, and manage the private networks, and therefore the private cloud users do not achieve the public cloud benefits of lower up-front capital costs and less hands-on management of the IT infrastructure. In a hybrid-cloud, users have the privilege of sharing resources between a private-cloud and a public cloud.

SUMMARY

In one example, a method for detecting nonlegitimate communications in a hybrid cloud system comprises receiving a request from a service on a public cloud platform, calculating a unique signature for the service, and verifying the calculated unique signature against a local signature table on the public cloud platform. If the calculated unique signature is verified, then the calculated unique signature is sent to a security signature service on a private cloud platform. If the calculated unique signature is also verified against a global signature table on the private cloud platform, then a response to the request is received from the security signature service. A security control entity in the public cloud platform may calculate the unique signature. The security control entity in the public cloud platform verifies the calculated unique signature against the local signature table.

If the calculated unique signature is not verified against the local signature table, then the request is terminated before being sent to the security signature service on the private cloud platform. If the calculated unique signature is not verified against the global signature table, then an indication that the request is from an unauthorized service is sent to the public cloud platform.

When the calculated unique signature is verified against the global signature table, then a request is sent to a target service on the private cloud platform, and a response to the request is sent to the security control entity on the public cloud platform.

The unique signature may be calculated using indicators associated with software and hardware components used by the service. The unique signature may be calculated using one or more of a BIOS serial number, an RSA identifier, a virtual private network (VPN) identifier, a hardware component MAC address, a CPU serial number, a RAM part number, a monitor serial number, a Domain Name System (DNS) server identifier, a Dynamic Host Configuration Protocol (DHCP) server identifier, a static IP address, and a universally unique identifier (UUID).

In another example, a method for deploying a service in a public cloud platform comprises configuring the service on the public cloud platform, calculating a unique signature for the service, storing the unique signature in a global signature table on a private cloud platform; and after receiving acknowledgement that the unique signature was stored in the global signature table, storing the unique signature in a local signature table in the public cloud platform. The unique signature is calculated by a security control entity on the public cloud platform. The security control entity sends the unique signature to a security signature service in the private cloud platform for storage in the global signature table.

The method of deploying the service further comprises receiving a request from the service at the security control entity on a public cloud platform, calculating a unique signature for the request, verifying the calculated unique signature against the local signature table, verifying the calculated unique signature against the global signature table, and sending the request to a target service on the private cloud platform if the calculated unique signature is verified against both the local signature table and the global signature table.

An example computer-readable storage device has instructions stored thereon for detecting nonlegitimate communications in a private cloud platform, wherein execution of the instructions by one or more processors causes the processors to establish a security signature service on the private cloud platform, receive, at the security signature service, a calculated signature from a security control entity on a public cloud platform, and verify the calculated signature against a signature table on the private cloud platform. If the calculated signature is verified, then a request associated with the calculated signature is sent to a target service on the private cloud platform, a response to the request is received, and the response is sent to the security control entity on the public cloud platform.

The calculated signature is received at the security signature service on the private cloud platform only if the calculated signature has been verified against a signature table on the public cloud platform. If the calculated signature cannot be verified against the signature table on the private cloud platform, then send an indication to the security control entity that the request is from an unauthorized service.

BRIEF DESCRIPTION OF THE DRAWINGS

The present invention(s) is/are illustrated by way of example and is/are not limited by the accompanying figures. Elements in the figures are illustrated for simplicity and clarity and have not necessarily been drawn to scale.

DETAILED DESCRIPTION

In the following description, numerous specific details are set forth in order to provide a thorough understanding of embodiments of the present invention. It will be apparent to one skilled in the art that embodiments of the present invention may be practiced without some of these specific details. Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). While embodiments of the present invention have been illustrated and described, the invention is not limited to these embodiments only. Numerous modifications, changes, variations, substitutions, and equivalents will be apparent to those skilled in the art, without departing from the scope of the invention, as described in the claim.

In a hybrid cloud, customers share resources between a private cloud and a public cloud. Organizations may avoid migrating to a hybrid-cloud due to known and unknown security risk. The organizations often do not fully trust public clouds to protect their data and/or their user' actions. Currently, trust between the private cloud and the public cloud is based on the public cloud functionality and/or third-party authentication methods. These solutions are based on authentication methods and not on identity detection. Embodiments disclosed herein address security risks caused by calls originating from malicious web service on the public cloud to web services on the private cloud. Additional security layers are added in order to remove the threat of a malicious web service in the public cloud that manipulating existing authorization methods to call web services in the private cloud. The web services may be, for example, applications that are accessible via the Internet using a standardized messaging system, such as XML.

Figure 1:
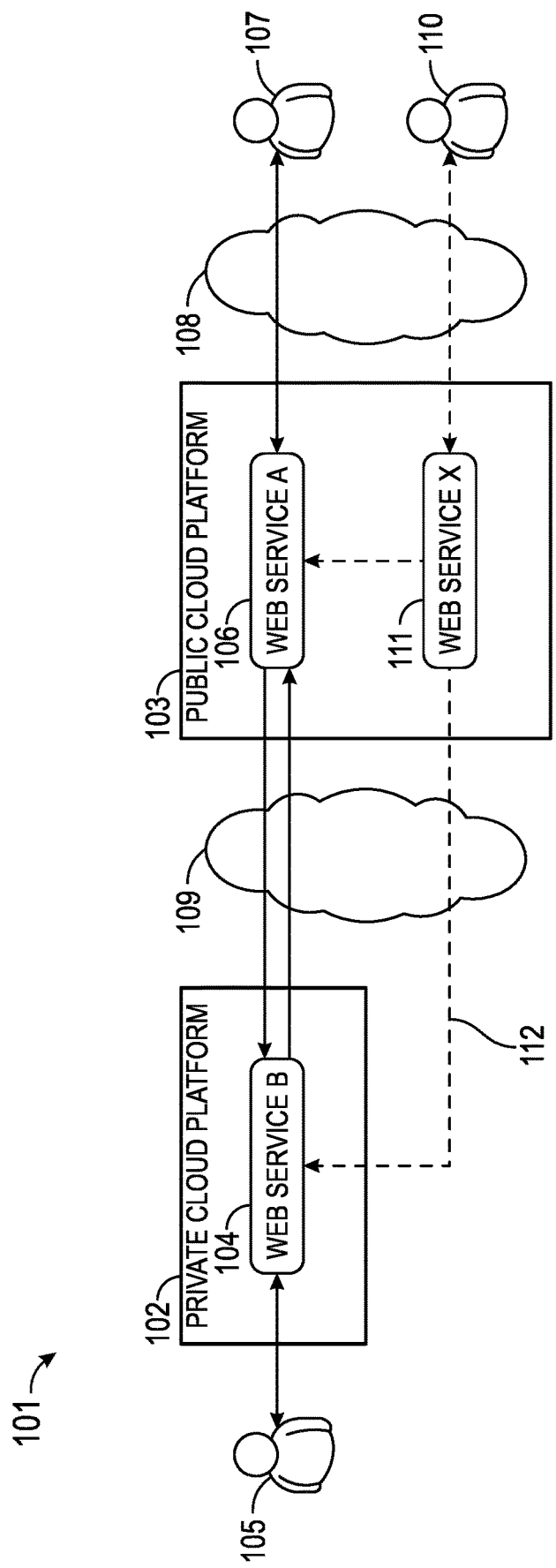
FIG. 1 is a high-level schematic view illustrating a hybrid cloud including a private cloud platform and a public cloud platform.

FIG. 1 is a high-level schematic view illustrating a hybrid cloud 101 including private cloud platform 102 and public cloud platform 103. Private cloud 102 hosts and executes a number of web services 104 that are available to users 105 of the private cloud 102, such as employees of an enterprise. Similarly, public cloud 103 hosts and executes a number of authorized web services 106. Public users 107 may access authorized web services 106 on public cloud 103 via a public network 108, such as the Internet. Authorized web services 106 may allow a public user 107 to remotely access web service 104 on private cloud 102, such as by exchanging messages between the services across a public or private network 109, which may be the same as or part of network 108. Because public cloud platform 103 is open to public users, security risks include the possibility that an unauthorized user 110 may create a malicious web service 111 on public cloud 103 with the intent of using that web service 111 to access authorized web service 106 or private cloud web service 104. Embodiments are directed to preventing the unauthorized user 110 from making unauthorized requests 112 to private cloud 102.

Figure 2:
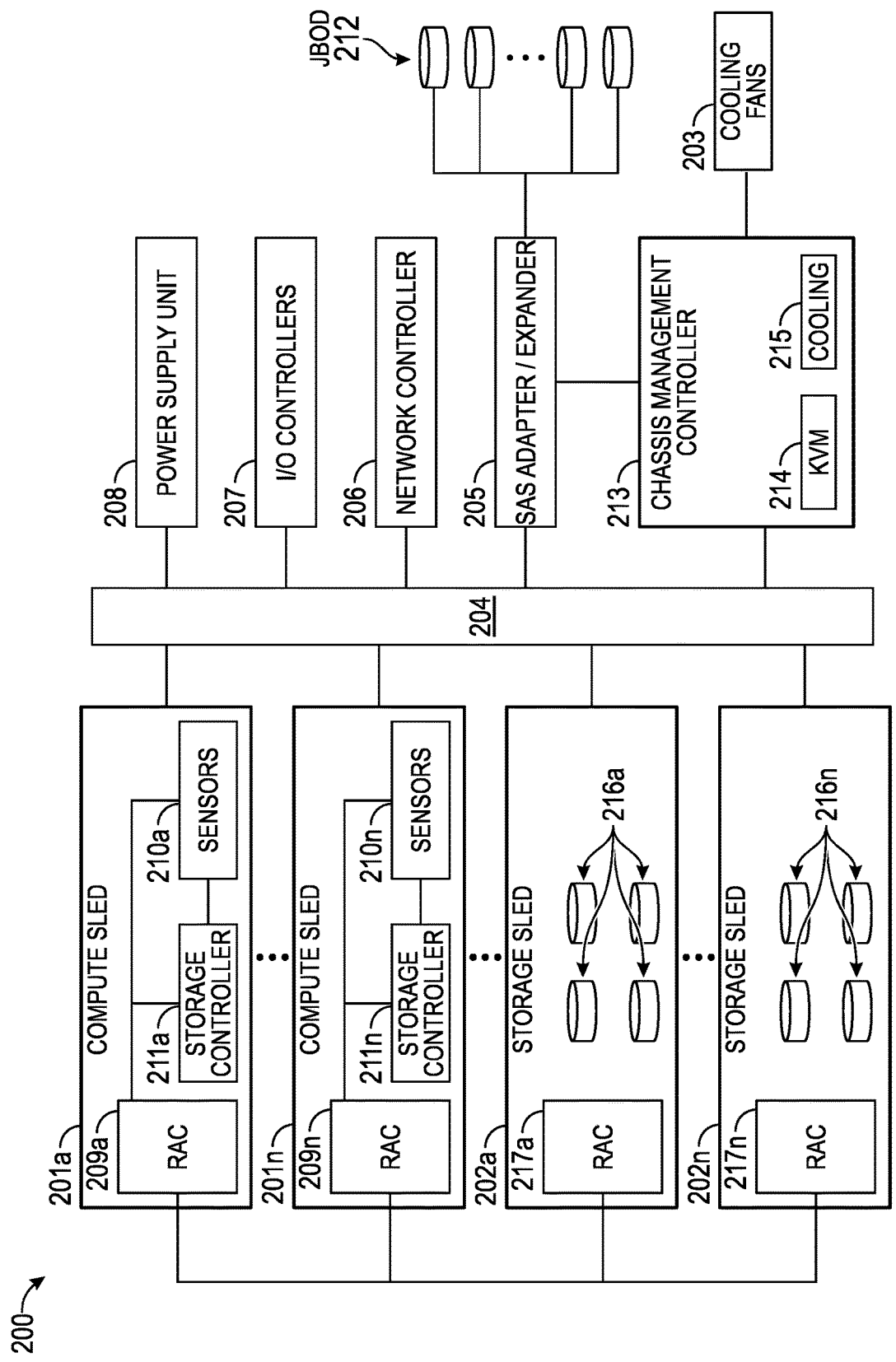
FIG. 2 is a block diagram illustrating certain components of a chassis that may be configured to implement a public cloud or private cloud.

FIG. 2 is a block diagram illustrating certain components of a chassis 200 comprising one or more compute sleds 201a-n and one or more storage sleds 202a-n that may be configured to implement a public cloud or private cloud, including systems and methods described herein for detection and prevention of unauthorized communications in a hybrid cloud. Chassis 200 may include one or more bays that each receive an individual sled, such as compute sleds 201a-n and storage sleds 202a-n. The sleds may be additionally or alternatively referred to as a tray, blade, server, drive, and/or node in various embodiments. Chassis 200 may support a variety of different numbers (e.g., 4, 8, 26, 32), sizes (e.g., single-width, double-width), and physical configurations of bays. Other embodiments may include additional types of sleds that provide various types of storage and/or processing capabilities. Other types of sleds may provide power management and networking functions. Sleds 201a-n,202a-n may be individually installed and removed from the chassis 200, thus allowing the computing and storage capabilities of a chassis to be reconfigured by swapping the sleds with different types of sleds, in many cases without affecting the ongoing operations of the other sleds installed in the chassis 200.

Multiple chassis 200 are typically housed within a rack, with each chassis installed in one or more slots of the rack. Datacenters, such as those used to implement a public or private cloud platform, may utilize large numbers of racks with various different types of rack configurations. The modular architecture provided by the sleds, chassis, and racks allow for certain resources, such as cooling, power, and network bandwidth, to be shared by the compute sleds 201*a-n* and storage sleds 202*a-n*, thus providing efficiency and supporting various types of computational loads.

Chassis 200 itself may be installed within a rack that provides all or part of the cooling utilized by the components of chassis 200. For airflow cooling, a rack may include one or more banks of cooling fans that may be operated to ventilate heated air from within the chassis 200 that is housed within the rack. The chassis 200 may alternatively or additionally include one or more cooling fans 203 that may be similarly operated to ventilate heated air from within the sleds 201*a-n*, 202*a-n* that are installed within the chassis. A rack and a chassis 200 installed within the rack may utilize various configurations and combinations of cooling fans to cool the sleds 201*a-n*, 202*a-n* and other components housed within chassis 200.

The sleds 201*a-n*, 202*a-n* may be individually coupled to chassis 200 via connectors that correspond to connectors provided by front-facing bays of the chassis 200, where these connectors physically and electrically couple an individual sled to a backplane 204 of the chassis, where the backplane may be additionally or alternatively be referred to as a midplane. Chassis backplane 204 may be a printed circuit board that includes electrical traces and connectors that are configured to route signals between components of chassis 200 that are connected to the backplane 204. In various embodiments, backplane 204 may include various additional components, such as cables, wires, connectors, expansion slots, and multiplexers. In certain embodiments, backplane 204 may be a motherboard that includes various electronic components installed thereon. Such components installed on a motherboard backplane 204 may include components that implement all or part of the functions described with regard to the SAS (Serial Attached SCSI) expander 205, network controller 206, I/O controllers 207, and power supply unit 208.

A compute sled 201*a-n* may provide computational processing resources that may be used to support a variety of e-commerce, multimedia, business, and scientific computing applications, such as services provided via a cloud implementation. Compute sleds 201*a-n* are typically configured with hardware and software that provide leading-edge computational capabilities. Accordingly, services provided using such computing capabilities are typically provided as high-availability systems that operate with minimum downtime. As described in additional detail with regard to FIG. 3, compute sleds 201*a-n* may be configured for general-purpose computing or may be optimized for specific computing tasks.

As illustrated, each compute sled 201*a-n* includes a remote access controller (RAC) 209*a-n* and each storage sled 202*a-n* includes a remote access controller (RAC) 217*a-n*. As described in additional detail with regard to FIG. 3, each remote access controller 209*a-n*, 217*a-n* provides capabilities for remote monitoring and management of compute sled 201*a-n* or storage sled 202*a-n*. In support of these monitoring and management functions, remote access controllers 209*a-n* may utilize both in-band and sideband (i.e., out-of-band) communications with various components of a compute sled 201*a-n* and datacenter 200. As illustrated, each compute sled 201*a-n* may include one or more sensors 210*a-n* that may generate various types of telemetry data that characterizes aspects of the operation of a respective compute sled 201*a-n*. For instance, sensors 210*a-n* may generate and/or collect telemetry data characterizing the performance of processing, networking, power and/or memory components of a compute sled 201*a-n*, as well as telemetry data from monitoring environmental properties, such as compute sled temperatures. In some embodiments, remote access controller 209*a-n* may track compute sled resource usage by individual virtual machines operating on compute sleds 201*a-n*, thus supporting tracking of compute sled resources used by these virtual machines and in detecting suspicious or otherwise unusual activity by file systems implemented by individual users of file sharing systems that may operate through virtual machines, such as described in additional detail below.

Each of the compute sleds 201*a-n* includes a storage controller 211*a-n* that may be utilized to access storage drives that are accessible via chassis 200. Some of the individual storage controllers 211*a-n* may provide support for RAID (Redundant Array of Independent Disks) configurations of logical and physical storage drives, such as storage drives provided by storage sleds 202*a-n*. In some embodiments, some or all of the individual storage controllers 211*a-n* may be HBAs (Host Bus Adapters) that provide more limited capabilities in accessing physical storage drives provided via storage sleds 202*a-n* and/or via SAS expander 205. In some embodiments, storage controller 211*a-n* may track data storage by individual users accessing a file sharing system via compute sleds 201*a-n*, thus supporting tracking of storage resources, and detecting activity indicative of a ransomware attacks.

As illustrated, chassis 200 also includes one or more storage sleds 202*a-n* that are coupled to the backplane 204 and installed within one or more bays of chassis 200 in a similar manner to compute sleds 201*a-n*. Each of the individual storage sleds 202*a-n* may include various different numbers and types of storage devices 216*a-n*. For instance, storage sleds 216*a-n-n* may include SAS (Serial Attached SCSI) magnetic disk drives, SATA (Serial Advanced Technology Attachment) magnetic disk drives, solid-state drives (SSDs) and other types of storage drives in various combinations. The storage sleds 202*a-n* may be utilized in various storage configurations by the compute sleds 201*a-n* that are coupled to chassis 200. As illustrated, each storage sled 202*a-n* may include one or more sensors. The sensors may generate various types of telemetry data that characterize aspects of the operation of a respective storage sled 202*a-n*.

In addition to the data storage capabilities provided by storage sleds 202*a-n*, chassis 200 may provide access to other storage resources that may be installed components of chassis 200 and/or may be installed elsewhere within a rack housing the chassis 200, such as within a storage blade. In certain scenarios, storage resources may be accessed via a SAS expander 205 that is coupled to the backplane 204 of the chassis 200. The SAS expander 205 may support connections to a number of JBOD (Just a Bunch Of Disks) storage drives 212 that may be configured and managed individually and without implementing data redundancy across the various drives 212. The additional storage resources 212 may also be at various other locations within a datacenter in which chassis 200 is installed. Such additional storage resources 212 may also be remotely located. In some instances, each of the storage drives and the SAS expander may generate telemetry and/or error data that may be reported to a chassis management controller 202.

As illustrated, the chassis 200 includes a network controller 206 that provides network access to the sleds 201*a-n*, 202*a-n* installed within the chassis. Network controller 206 may include various switches, adapters, controllers, and couplings used to connect chassis 200 to a network, either directly or via additional networking components and connections provided via a rack in which chassis 200 is installed.

Chassis 200 may similarly include a power supply unit 208 that provides the components of the chassis with various levels of DC power from an AC power source or from power delivered via a power system provided by a rack within which chassis 200 may be installed. In certain embodiments, power supply unit 208 may be implemented within a sled that provides chassis 200 with redundant, hot-swappable power supply units.

Chassis 200 may also include various I/O controllers 207 that may support various I/O ports, such as USB ports that may be used to support keyboard and mouse inputs and/or video display capabilities. Such I/O controllers 207 may be utilized by a chassis management controller 213 to support various KVM (Keyboard, Video and Mouse) 214 capabilities that provide administrators with the ability to interface with the chassis 200.

In addition to providing support for KVM 202a capabilities for administering chassis 200, a chassis management controller 213 may support various additional functions for sharing the infrastructure resources of chassis 200. In some scenarios, chassis management controller 213 may implement tools for managing the power 208, network bandwidth 206, and airflow cooling 203 that are available via the chassis 200. As described, the airflow cooling 203 utilized by chassis 200 may include an airflow cooling system that is provided by a rack in which the chassis 200 may be installed and managed by a cooling module 215 of the chassis management controller 213. In some embodiments, the operations of a chassis management controller 213 may be implemented by one of the compute sled or storage sled remote access controllers 209a-n, 209a-n that has been designated and configured for managing chassis-level configurations.

Figure 3:
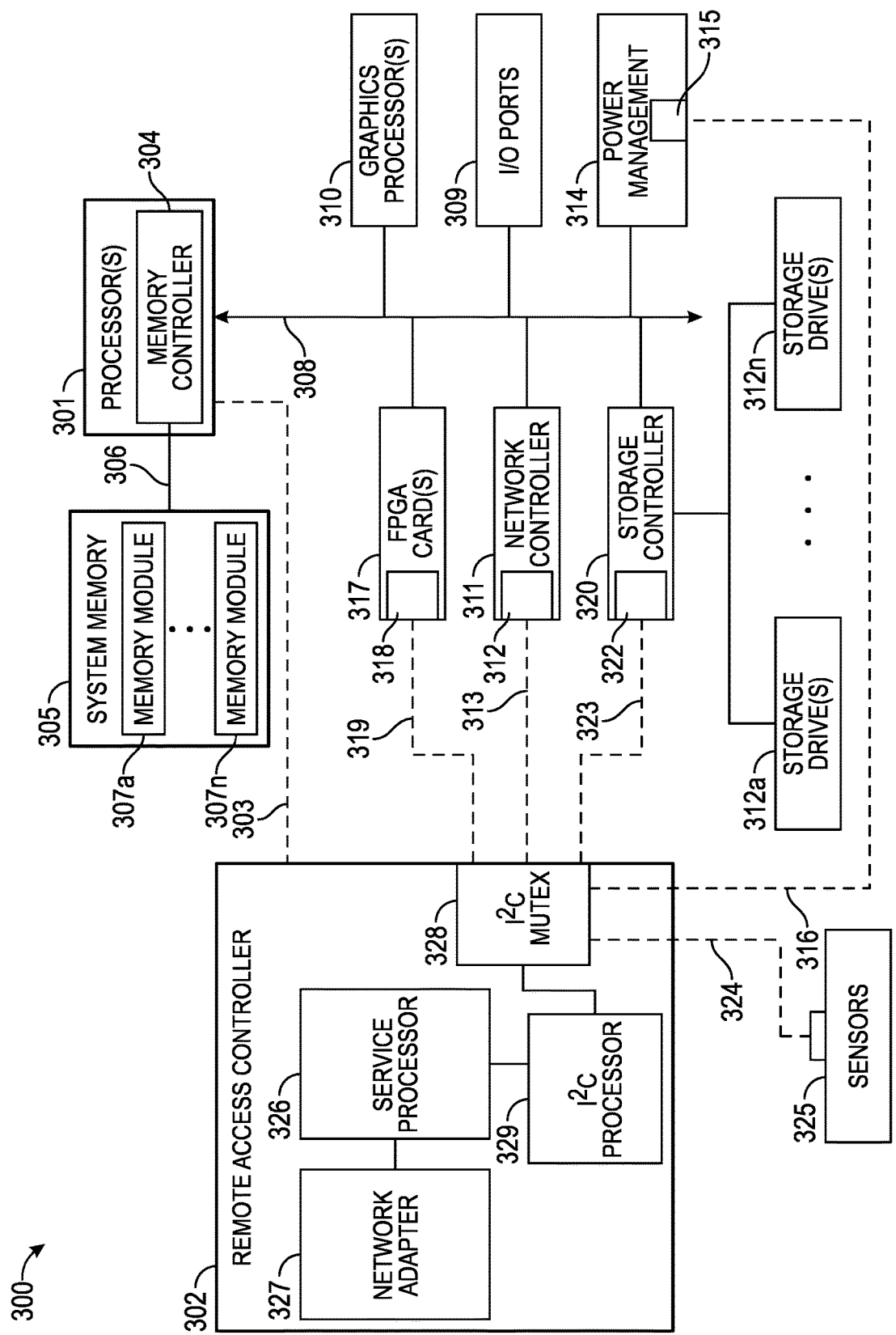
FIG. 3 shows an example of an information handling system configured to implement systems and methods described herein for providing a cloud computing platform.

FIG. 3 shows an example of an IHS 300 configured to implement systems and methods described herein for providing a cloud computing platform. It should be appreciated that although the embodiments described herein may describe an IHS that is a compute sled, server or similar computing component that may be deployed within a rack-mounted chassis, other embodiments may be utilized with other types of IHSs. In the illustrative embodiment, IHS 300 may be a computing component, such as compute sled 201a-n, that is configured to share infrastructure resources provided by a chassis 200.

IHS 300 may be a compute sled, such as compute sleds 201a-n of FIG. 2, that may be installed within a datacenter that may in turn be installed within a rack. Installed in this manner, IHS 300 may utilize shared power, network and cooling resources provided by the datacenter and/or rack. IHS 300 may utilize one or more processors 301. In some embodiments, processors 301 may include a main processor and a co-processor, each of which may include a plurality of processing cores that, in certain scenarios, may be used in operating multiple virtualized computing environments. In certain embodiments, one or all of processor(s) 301 may be graphics processing units (GPUs) in scenarios where IHS 300 has been configured to support functions such as multimedia services and graphics applications.

In some embodiments, processor 301 may be configured to operate as a source of telemetry data providing physical sensor data, such as junction temperatures and power consumption. Processor 201 may also be configured to operate as a source logical telemetry data, such as remaining CPU processing capacity. In some embodiments, processor 301 may be configured by remote access controller 302 to generate telemetry data that is reported to the remote access controller, where the configuration and reporting of this telemetry data may be via a PECI (Platform Environment Control Interface) bus 203 operations.

As illustrated, processor(s) 201 includes an integrated memory controller 304 that may be implemented directly within the circuitry of the processor 301, or the memory controller 304 may be a separate integrated circuit that is located on the same die as the processor 301. The memory controller 304 may be configured to manage the transfer of data to and from the system memory 305 of the IHS 300 via a high-speed memory interface 306. In some embodiments, memory controller 304 may be configured to operate as a source of telemetry data capable of generating reports that are reported to remote access controller 302. The telemetry data reported by memory controller 304 may include metrics such as the amount of available system memory 305 and memory transfer rates via memory interface 306.

The system memory 305 is coupled to processor(s) 301 via a memory bus 306 that provides the processor(s) 301 with high-speed memory used in the execution of computer program instructions by the processor(s) 301. Accordingly, system memory 305 may include memory components, such as such as static RAM (SRAM), dynamic RAM (DRAM), NAND Flash memory, suitable for supporting high-speed memory operations by the processor(s) 301. In certain embodiments, system memory 305 may combine both persistent, non-volatile memory and volatile memory. In certain embodiments, the system memory 305 may be comprised of multiple removable memory modules. The system memory 305 of the illustrated embodiment includes removable memory modules 307a-n. Each of the removable memory modules 307a-n may correspond to a printed circuit board memory socket that receives a specific type of removable memory module 307a-n, such as a DIMM (Dual In-line Memory Module), that can be coupled to the socket and then decoupled from the socket as needed, such as to upgrade memory capabilities or to replace faulty components. Other embodiments of IHS system memory 305 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 300 may utilize a chipset that may be implemented by integrated circuits that are connected to each processor 30 All or portions of the chipset may be implemented directly within the integrated circuitry of an individual processor 301. The chipset may provide the processor(s) 301 with access to a variety of resources accessible via one or more buses 308. Various embodiments may utilize any number of buses to provide the illustrated pathways served by bus 308. In certain embodiments, bus 308 may include a PCIe (PCI Express) switch fabric that is accessed via a PCIe root complex. IHS 300 may also include one or more I/O ports 309, such as PCIe ports, that may be used to couple the IHS 300 directly to other IHSs, storage resources or other peripheral components.

In certain embodiments, a graphics processor 310 may be comprised within one or more video or graphics cards, or an embedded controller, installed as components of the IHS 300. In certain embodiments, graphics processor 310 may be an integrated of the remote access controller 302 and may be utilized to support the display of diagnostic and administrative interfaces related to IHS 300 via display devices that are coupled, either directly or remotely, to remote access controller 302.

In the illustrated embodiments, processor(s) 301 is coupled to a network controller 311, such as provided by a Network Interface Controller (NIC) that is coupled to the IHS 300 and allows the IHS 300 to communicate via an external network, such as the Internet or a LAN. As illustrated, network controller 311 may be instrumented with a controller or other logic unit 312 that supports a sideband management connection 313 with remote access controller 255. Via the sideband management connection 313, network controller 311 may be configured to operate as a source of telemetry data that may include environmental metrics, such as temperature measurements, and logical sensors, such as metrics reporting input and output data transfer rates.

Processor(s) 301 may also be coupled to a power management unit 314 that may interface with the power system unit 208 of the datacenter in which IHS 300 may be installed. As with network controller 311, power management unit 314 may be instrumented with a controller or other logic unit 315 that supports a sideband management connection 316 with remote access controller 302. Via the sideband management connection 316, power management unit 314 may be configured to operate as a source of telemetry data that may include physical sensors, such as a sensors providing temperature measurements and sensors providing power output measurements, and logical sensors, such as capabilities reporting discrete power settings.

As illustrated, IHS 300 may include one or more FPGA (Field-Programmable Gate Array) card(s) 317. Each FPGA card 317 supported by IHS 300 may include various processing and memory resources, in addition to an FPGA integrated circuit that may be reconfigured after deployment of IHS 300 through programming functions supported by the FPGA card 317. FGPA card 317 may be optimized to perform specific processing tasks, such as specific signal processing, security, data mining, and artificial intelligence functions, and/or to support specific hardware coupled to IHS 300. FPGA card 317 may include one or more physical and/or logical sensors. As specialized computing components, FPGA cards may be used to support large-scale computational tasks that may result in the FPGA card 317 generating significant amounts of heat. In order to protect specialized FPGA cards from damaging levels of heat, FPGA card 317 may be outfitted with multiple temperature sensors. FPGA card 317 may also include logical sensors that are sources of metric data, such as metrics reporting numbers of calculations performed by the programmed circuitry of the FPGA. The FPGA card 317 may also include a management controller 318 that may support interoperation was the remote access controller 302 via a sideband device management bus 319.

In certain embodiments, IHS 300 may operate using a BIOS (Basic Input/Output System) that may be stored in a non-volatile memory accessible by the processor(s) 301. The BIOS may provide an abstraction layer by which the operating system of the IHS 300 interfaces with the hardware components of the IHS. Upon powering or restarting IHS 300, processor(s) 301 may utilize BIOS instructions to initialize and test hardware components coupled to the IHS, including both components permanently installed as components of the motherboard of IHS 300 and removable components installed within various expansion slots supported by the IHS 300. The BIOS instructions may also load an operating system for use by the IHS 300. In certain embodiments, IHS 300 may utilize Unified Extensible Firmware Interface (UEFI) in addition to or instead of a BIOS. In certain embodiments, the functions provided by BIOS may be implemented, in full or in part, by the remote access controller 302.

IHS 300 may include one or more storage controllers 320 that may be utilized to access storage drives 321*a-n* that are accessible via the chassis in which IHS 300 is installed. Storage controller 320 may provide support for RAID (Redundant Array of Independent Disks) configurations of logical and physical storage drives 312*a-n*. In some embodiments, storage controller 320 may be an HBA (Host Bus Adapter) that provides more limited capabilities in accessing physical storage drives 321*a-n*. In some embodiments, storage drives 321*a-n* may be replaceable, hot-swappable storage devices that are installed within bays provided by the chassis in which IHS 300 is installed. In some embodiments, storage drives 321*a-n* may also be accessed by other IHSs that are also installed within the same chassis as IHS 300.

In embodiments where storage drives 321*a-n* are hot-swappable devices that are received by bays of datacenter, the storage drives 321*a-n* may be coupled to IHS 300 via couplings between the bays of the chassis and a midplane of IHS 300. Storage drives 321*a-n* may include SAS (Serial Attached SCSI) magnetic disk drives, SATA (Serial Advanced Technology Attachment) magnetic disk drives, solid-state drives (SSDs) and other types of storage drives in various combinations.

In some embodiment, IHS 300 may be used to implement file sharing systems that utilize the Server Message Block (SMB) file sharing protocol. The Server Message Block protocol is a client-server communication protocol used for sharing access to files, and in some cases other resources, over a network. In a file sharing, the SMB protocol provides the inter-process communications that implement protocols for file-level transactions. The SMB protocol is a network file sharing protocol that allows client applications on a user's IHS to setup and conduct remote file level operations, such as reading and writing shared files. In some embodiments, an SMB file sharing system may be implemented using an IHS 300 in which one or more storage drives 321*a-n* are utilized as shared volumes that are used to implement a file system that is shared through use of SMB commands by users of the file sharing system. In some embodiments, the shared volumes of an SMB file sharing system may utilize storage drives on multiple IHSs, such as storage drives 321*a-n* of multiple IHSs that are similarly configured to IHS 300.

As illustrated, storage controller 230 may be instrumented with a controller or other logic unit 322 that supports a sideband management connection 323 with remote access controller 302. Via the sideband management connection 323, storage controller 320 may be configured to operate as a source of telemetry data regarding the operation of storage drives 321*a-n*. For instance, controller 322 may collect metric data characterizing the performance of individual storage drives 321*a-n*, such as available storage capacity and data transfer rates, as well as environmental properties, such as storage drive temperatures. In some embodiments, a storage controller 320 may be utilized in implementing an file sharing system that utilizes one of more of storage drives 321*a-n* as shared volumes. In such embodiments, storage controller 320 may monitor SMB commands received from users of the file sharing system. As described below, this collected SMB data may be used to compile a profile of normal file sharing activity by individual users, which may then be used to detect anomalous file sharing activity by that user that is consistent with a ransomware attack. In some embodiments, storage controller 320 may track and maintain a record of recent SMB commands issued by a user of IHS 300, in some instances tracking all SMB commands by a user during an ongoing SMB session. In such embodiments, the session data monitored and collected by storage controller 320 may be used to reverse all SMB commands by a user during and SMB session, such as in response to detecting a ransomware pattern in the SMB commands issued by the user.

In certain embodiments, remote access controller 302 may operate from a different power plane from the processors 301 and other components of IHS 300, thus allowing the remote access controller 302 to operate, and management tasks to proceed, while the processing cores of IHS 300 are powered off. As described, various functions provided by the BIOS, including launching the operating system of the IHS 300, may be implemented by the remote access controller 302. In some embodiments, the remote access controller 302 may perform various functions to verify the integrity of the IHS 300 and its hardware components prior to initialization of the IHS 300 (i.e., in a bare-metal state).

In some embodiments, remote access controller 302 may also be directly coupled via I2C couplings 324 with one or more sensors 325, such as sensors that provide measurements of ambient inlet temperatures, outlet airflow temperatures and temperatures at various locations within IHS 300. Sensors 325 coupled directly to remote access controller 302 may also be used in implementing security protocols, such as intrusion detection sensors and user proximity sensors.

Remote access controller 302 may include a service processor 326, or a specialized microcontroller, that operates management software that supports remote monitoring and administration of IHS 300. Remote access controller 302 may be installed on the motherboard of IHS 300 or may be coupled to IHS 300 via an expansion slot provided by the motherboard. In support of remote monitoring functions, network adapter 327 may support connections with remote access controller 302 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 302 may support monitoring and administration of various managed devices 311, 314, 317, 320, 325 of an IHS via a sideband bus interface. For instance, messages utilized in device management may be transmitted using I2C sideband bus connections that may be individually established with each of the respective managed devices 311, 314, 317, 320, 325 through the operation of an I2C multiplexer 328 of the remote access controller. As illustrated, certain of the managed devices of IHS 300, such as FPGA cards 317, network controller 311, storage controller 320 and power management unit 314, are coupled to the IHS processor(s) 301 via an in-line bus 308, such as a PCIe root complex, that is separate from the I2C sideband bus connections 313, 316, 319, 323, 324 used for device management.

In certain embodiments, the service processor 326 of remote access controller 302 may rely on an I2C co-processor 329 to implement sideband I2C communications between the remote access controller 302 and managed components 311, 314, 317, 320, 325 of the IHS. The I2C co-processor 329 may be a specialized co-processor or micro-controller that is configured to interface via a sideband I2C bus interface with the managed hardware 311, 314, 317, 320, 325 of IHS. In some embodiments, the I2C co-processor 329 may be an integrated component of the service processor 326, such as a peripheral system-on-chip feature that may be provided by the service processor 326. Each I2C bus 275a-e is illustrated as single line in FIG. 3. However, each I2C bus 313, 316, 319, 323, 324 may be comprised of a clock line and data line that couple the remote access controller 302 to I2C endpoints 312, 315, 318, 322 on each of the managed components.

In various embodiments, an IHS 300 does not include each of the components shown in FIG. 3. In various embodiments, an IHS 300 may include various additional components in addition to those that are shown in FIG. 3. Furthermore, some components that are represented as separate components in FIG. 3 may in certain embodiments instead be integrated with other components. For example, in certain embodiments, all or a portion of the functionality provided by the illustrated components may instead be provided by components integrated into the one or more processor(s) 301 as a systems-on-a-chip.

In example embodiments, one or more chassis 200 (FIG. 2) having one or more IHS 300 (FIG. 3) as compute and/or storage sleds may be used as a private cloud platform or a public cloud platform.

Figure 4:
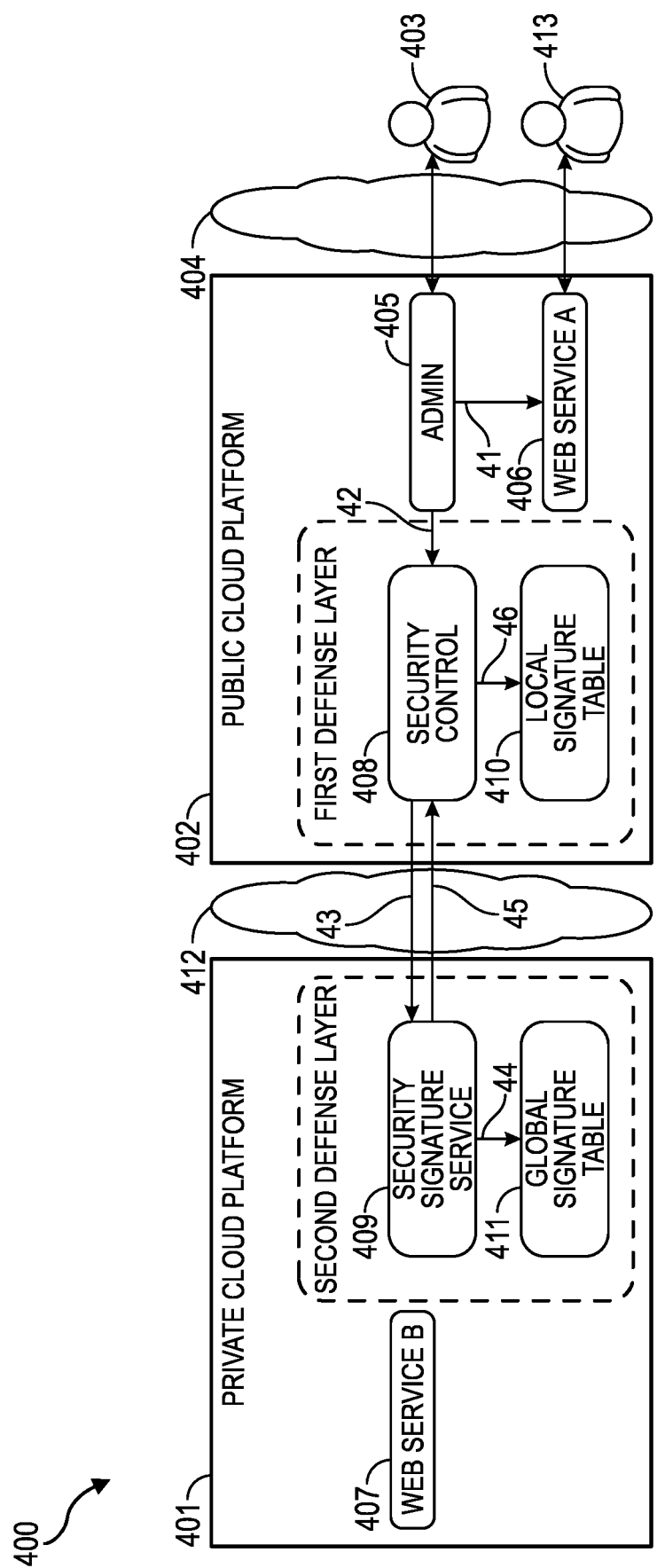
FIG. 4 is a block diagram illustrating a deployment model for a hybrid cloud including a private cloud platform and a private cloud platform.

FIG. 4 is a block diagram illustrating a deployment model for a hybrid cloud 400 including private cloud platform 401 and private cloud platform 402. A user 403 accesses public cloud 402 via a public network 404, such as the Internet. User 403 interacts with an administrative interface 405 or a datacenter manager to deploy and publish a new web service 406 on public cloud 402. User 403 may be associated with an enterprise hosting private cloud 401, for example, and public web service 406 may be configured to interact with a related web service 407 on private cloud 401. Admin interface 405 manages procuring and provisioning infrastructure resources on public cloud 402 for web service 406. In example embodiments, a double verification of such communication is required for public web service 406 to communicate and interact with private web service 407. This communication is controlled by a security control module 408 on public cloud 402 and security signature service 409 on private cloud 401.

Security control 408 manages and maintains a local signature table 410 on the public cloud 402. Together, security control 408 and local signature table 410 provide a first defense layer in the hybrid cloud 400. Security signature service 409 manages and maintains a global signature table 411 on private cloud 402. Together, security signature service 409 and global signature table 411 provide a second defense layer in the hybrid cloud 400.

Admin interface 405 first deploys web service 406 with commands 41. Admin interface 405 then sends message 42 to security control 408 announcing the new web service 406 as legitimate and assigning permission for web service 406 to access remote web service 407. Security control 408 then creates a unique signature for web service 406 that is based upon both hardware and software components. The unique signature is generated by compiling various unique indicators associated with web service 406. For example, one or more of a BIOS serial number, RSA identifier, virtual private network (VPN) identifier, hardware component MAC address, CPU serial number, RAM part number, monitor serial number, Domain Name System (DNS) server identifier, Dynamic Host Configuration Protocol (DHCP) server identifier, static IP address, a universally unique identifier (UUID), or other indicators for web service 406 may be used as components of the unique signature.

Security control 408 then sends the unique signature to security signature service 409 in message 43. Security control 408 and security signature service 409 communicate via network 412, which may be a public or private network, such as portion of network 404, an intranet, or the Internet. Security signature service 409 stores the unique signature to global signature table 411 with message 44. Security signature service 409 confirms storage of the unique signature in message 45 sent to security control 408. Once the unique signature has been stored in the global signature table 411, then security control 408 stores that unique signature in local signature table 410 in message 46.

The unique signature functions as an allowed list that indicates what services, such as web service 407, may be accessed by web service 406 and may indicate what users, such as user 403, may generate calls from public web service 406 to private web service 407. The unique signature is stored in two places with a primary copy in global signature table 411 and a copy in local signature table 410; however, the copy in local signature table 410 is stored only if the unique signature has already been received in global signature table 411. This creates a one-directional relationship in which the private cloud platform 401 is trusted without requiring or expecting trust on the public cloud platform 402.

Figure 5:
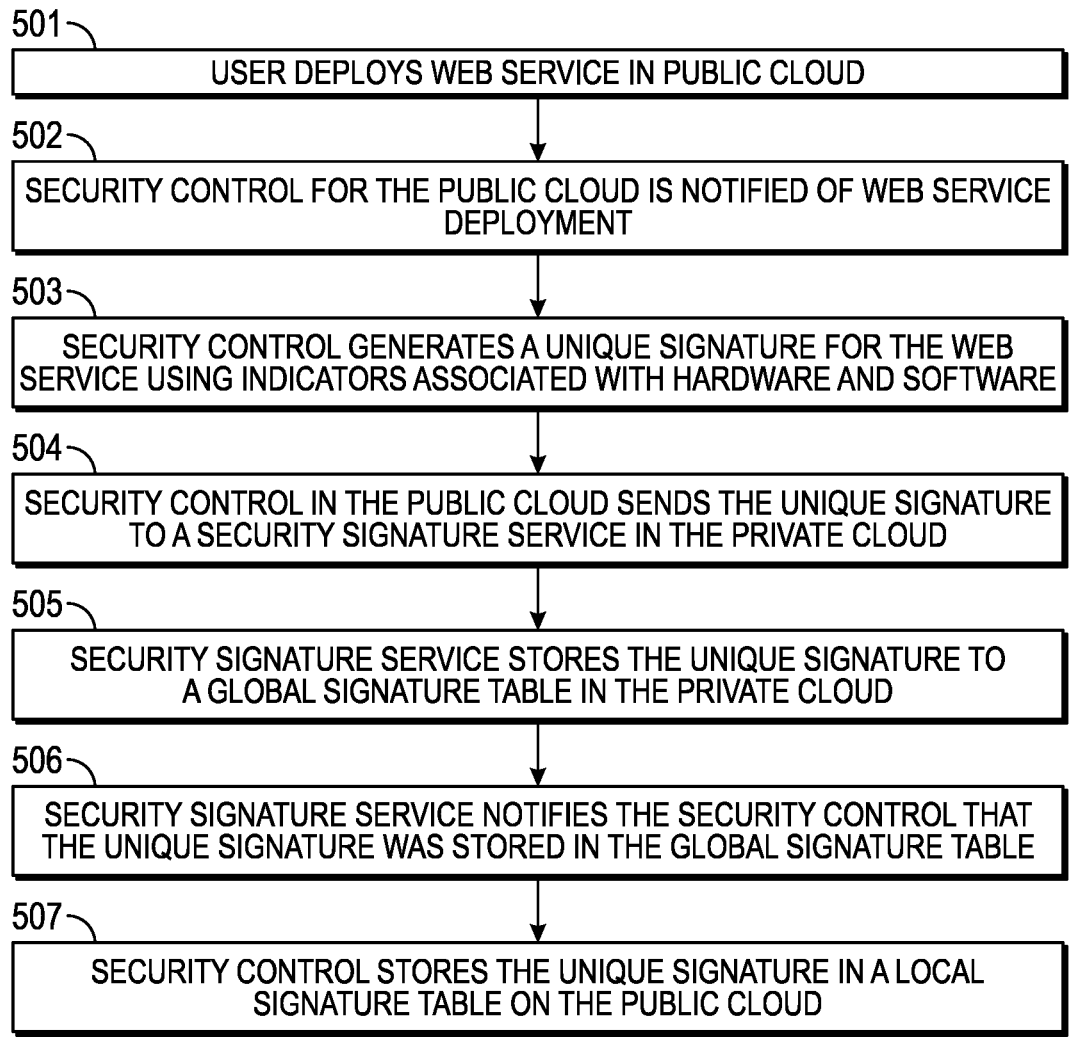
FIG. 5 is a flowchart illustrating a method for deploying a web service in a hybrid cloud according to one embodiment.

FIG. 5 is a flowchart illustrating a method for deploying a web service in a hybrid cloud according to one embodiment. In step 501, a user deploys a web service in a public cloud. In step 502, security control in the public cloud is notified of the web service deployment. In step 503, security control generates a unique signature for the web service using indicators associated with hardware and software components used in the deployment.

In step 504, security control in the public cloud sends the unique signature to a security signature service in the private cloud. In step 505, the security signature service stores the unique signature to a global signature table in the private cloud. In step 506, the security signature service notifies the security control that the unique signature was stored in the global signature table. In step 507, security control stores the unique signature in a local signature table on the public cloud.

Figure 6:
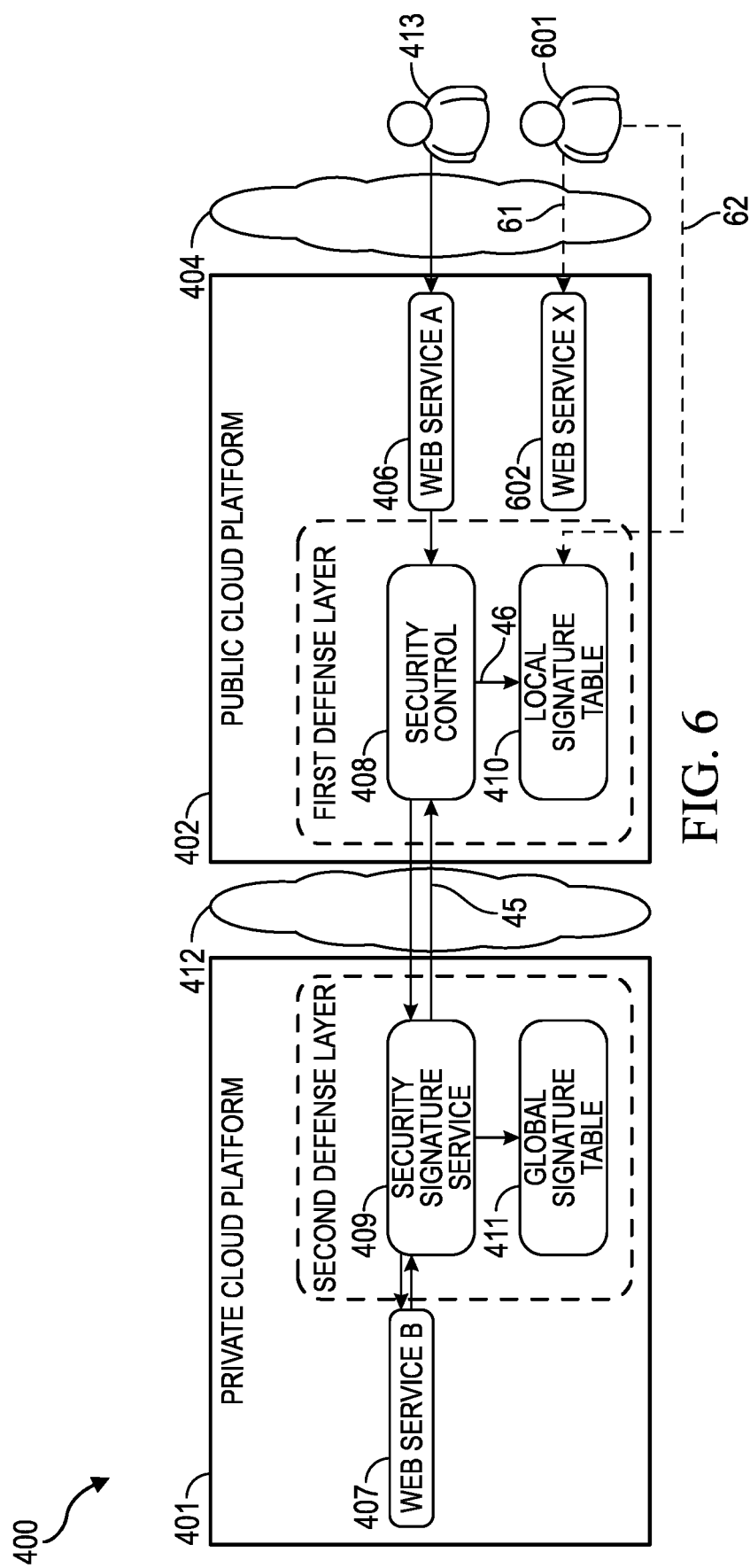
FIG. 6 is a block diagram illustrating the hybrid cloud of FIG. 4 in which a malicious user attempts to create an unauthorized web service during an attack on the hybrid cloud.

FIG. 6 is a block diagram illustrating the hybrid cloud 400 of FIG. 4 in which a malicious user 601 attempts to create an unauthorized web service 602 during an attack on the hybrid cloud 400. During normal operation, a user 413 accesses web service 406 on public cloud 402. Web service 406 will send a request call to web service 407 on private cloud 401. That request is verified by security control 408 on the public cloud 402 by calculating a signature for web service 406 and matching the signature with an expected signature in local signature table 410 on public cloud 401. If the request signature is verified successfully on public cloud 402, then security control 408 requests security signature service 409 on private cloud 401 to verify the request signature in the global signature table 411. If private cloud 401 verifies the request signature successfully, then security control 408 forwards the request to the destination web service 407. However, if verification against the global signature table fails, then that indicates tempering on the public cloud 402, such as a signature overwritten in the local signature table 410.

Malicious user 601 may gain access to public cloud 402 and create 61 unauthorized web service 602, which may be configured to attempt access to web service 407 on private cloud 401. Since unauthorized web service 602 was created in the normal course by an approved process, then no matching signature will be created and stored to local signature table 410. The only way to create an authorized signature is for two things to occur: (1) security control 408 must receive a message 45 from security signature service 409 indicating that a signature was stored in the global signature table 411, and (2) then security control 408 must write the signature to local signature table 410. Web service 602 does not go through this process, so an authorized signature is never created.

In some examples, the malicious user 601 may find the location of local signature table 410 on public cloud platform 402. The malicious user 601 may attempt to write 62 directly to the local signature table 410 to add a signature associated with unauthorized web service 602. However, since global signature table 411 is immutable and cannot be updated from outside private cloud 401, there will be a misalignment between global signature table 411 and local signature table 410.

Figure 7:
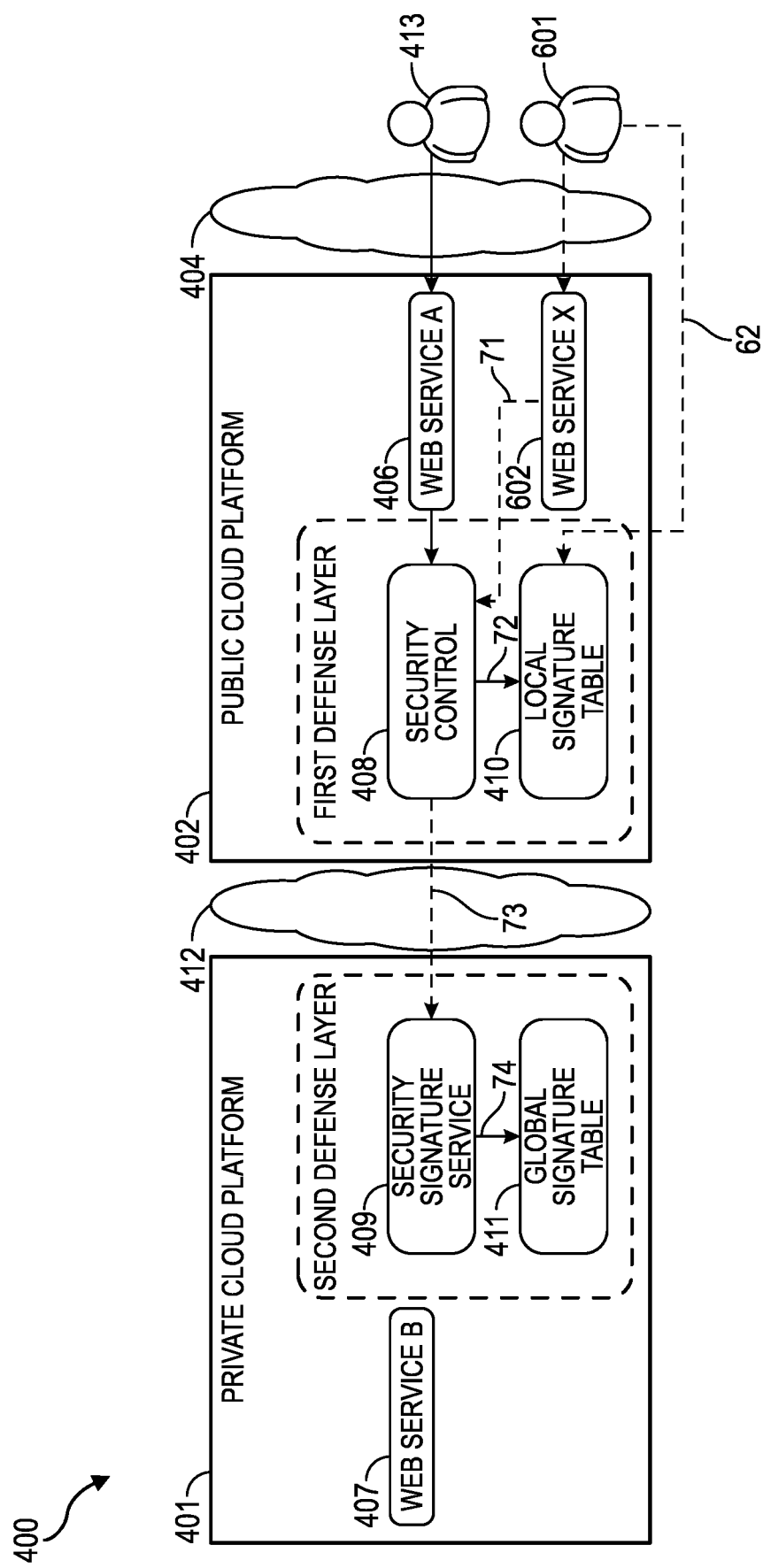
FIG. 7 is a block diagram illustrating the hybrid cloud of FIG. 6 in which a malicious user attempts to access the private cloud during an attack on the hybrid cloud.

FIG. 7 is a block diagram illustrating the hybrid cloud 400 of FIG. 6 in which a malicious user 601 attempts to access the private cloud 401 during an attack on the hybrid cloud 400. Using an immutable global signature table 411 and a local signature table 410, hybrid cloud 400 provides two layers of defense.

Attacks on hybrid cloud 400 may be detected at the first defense layer when no appropriate signature exists in local signature table 410. For example, malicious user 601 may access web service 602 and initiate a request to web service 407 on private cloud 401. As noted above, the normal handling of such a request includes a call 71 to security control 408 from web service 602. Security control 408 calculates a signature for web service 602 from information included in call 71, which will be unauthorized since web service 602 was not properly registered. Security control 408 compares 72 that unauthorized signature against local signature table 410. When the unauthorized signature cannot be matched to local signature table 410, security control 408 will not make a further attempt to complete the request to the private cloud 401 and will not make a call to security signature service 409. Security control 408 may take further action, such as blocking, isolating, or deleting web service 602, when the signature check fails in the first defense layer.

If a malicious user 601 was able to modify 62 local signature table 410 and add an unauthorized signature for web service 602, then the public cloud 402 may not detect the attack at the first defense layer. Instead, security control 408, will match the unauthorized signature for call 71 with the improperly added 62 unauthorized signature in local signature table 410. Since no error is detected at this stage (i.e., request 72 will pass), security control 408 will forward a request 73 to security signature service 409. Request 73 includes the unauthorized signature for unauthorized web service 602. Security signature service 409 in private cloud 401 will attempt to match 74 that unauthorized signature in global signature table 411. However, because malicious user 601 cannot access immutable global signature table 411, the unauthorized signature will not be found at the second defense layer. Therefore, security signature service 409 will not forward the request 73 or any other requests with the unauthorized signature to web service 407. Security signature service 409 may take further action, such as notifying security control 408 of the failure to match signatures and/or blocking further communication using the unauthorized signature.

Figure 8:
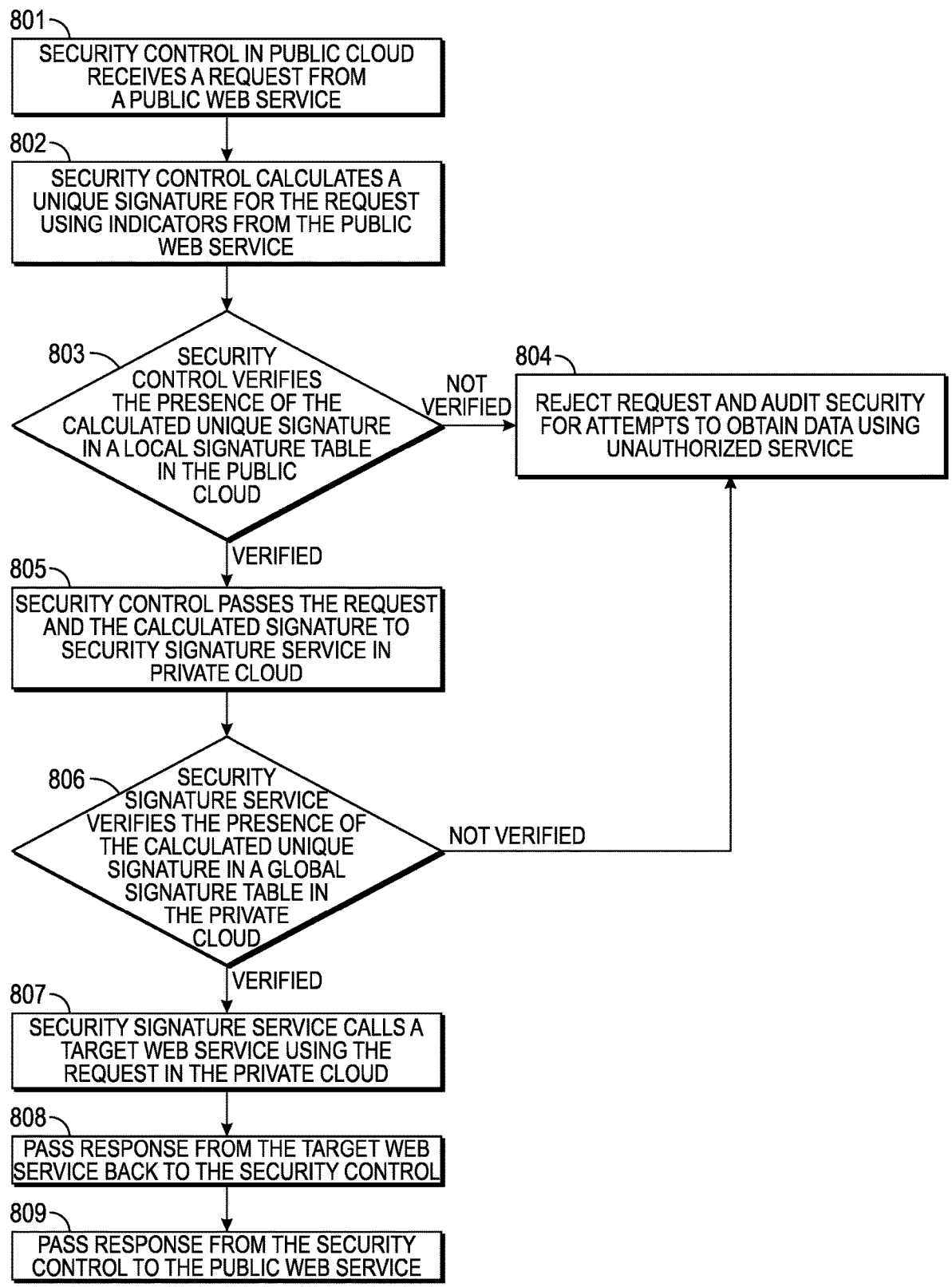
FIG. 8 is a flowchart illustrating an example process for validating and authenticating web service communications so that non-legitimate requests can be detected.

FIG. 8 is a flowchart illustrating an example process for validating and authenticating web service communications so that non-legitimate requests can be detected. In step 801, a security control module or application running in a public cloud receives a request from a web service that is also running in the public cloud. In step 802, security control calculates a unique signature for the request using indicators from the web service. In step 803, security control verifies the presence of the calculated unique signature in a local signature table in the public cloud. If the calculated signature cannot be verified in the local signature table, then the security control rejects the request in step 804. Security control may also trigger a security audit to identify attempts to obtain data using an unauthorized service.

If the calculated signature is verified in step 803, then security control passes the request and the calculated signature to security signature service in private cloud in step 805. In step 806, the security signature service verifies the presence of the calculated unique signature in a global signature table in the private cloud. If the calculated signature cannot be verified in the global signature table, then the security signature service rejects the request in step 804.

If the calculated signature is verified in step 806, then the security signature service calls a target web service using the request in the private cloud in step 807. In step 808, the security signature service passes a response from the target web service back to the security control. In step 809, security control passes the response to the public web service.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid-state memory, magnetic tape, a removable computer diskette, a random-access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A method, comprising:
   receiving a request from a service on a public cloud platform;
   calculating a unique signature for the service;
   verifying the calculated unique signature against a local signature table on the public cloud platform;
   if the calculated unique signature is verified, then:
   sending the calculated unique signature to a security signature service on a private cloud platform;
   receiving a response to the request from the security signature service if the calculated unique signature is verified against a global signature table on the private cloud platform;
   verifying, by the security signature service, the calculated unique signature against the global signature table; and
   wherein if the calculated unique signature is verified against the global signature table, then
   sending the request to a target service on the private cloud platform; and
   sending a response to the request to a security control entity on the public cloud platform.

2. The method of claim 1, further comprising:
   if the calculated unique signature is not verified against the local signature table, then terminating the request before sending to the security signature service.

3. The method of claim 1, further comprising:
   if the calculated unique signature is not verified against the global signature table, then receiving an indication that the request is from an unauthorized service.

4. The method of claim 1, wherein the security control entity in the public cloud platform calculates the unique signature.

5. The method of claim 1, wherein the security control entity in the public cloud platform verifies the calculated unique signature against the local signature table.

6. The method of claim 1, wherein the unique signature is calculated using indicators associated with software and hardware components used by the service.

7. The method of claim 1, wherein the unique signature is calculated using one or more of a BIOS serial number, an RSA identifier, a virtual private network (VPN) identifier, a hardware component MAC address, a CPU serial number, a RAM part number, a monitor serial number, a Domain Name System (DNS) server identifier, a Dynamic Host Configuration Protocol (DHCP) server identifier, a static IP address, and a universally unique identifier (UUID).

8. A method, comprising:
deploying a service on a public cloud platform;
calculating a unique signature for the service;
storing the unique signature in a global signature table on a private cloud platform;
after receiving acknowledgement that the unique signature was stored in the global signature table, storing the unique signature in a local signature table in the public cloud platform;
receiving a request from the service at a security control entity on the public cloud platform;
calculating a unique signature for the request;
verifying the calculated unique signature against the local signature table;
verifying the calculated unique signature against the global signature table; and
sending the request to a target service on the private cloud platform if the calculated unique signature is verified against both the local signature table and the global signature table.

9. The method of claim 8, wherein the unique signature is calculated by the security control entity on the public cloud platform, and wherein the security control entity sends the unique signature to a security signature service in the private cloud platform for storage in the global signature table.

10. The method of claim 8, wherein the unique signature is calculated using indicators associated with software and hardware components used by the service.

11. The method of claim 8, wherein the unique signature is calculated using one or more of a BIOS serial number, an RSA identifier, a virtual private network (VPN) identifier, a hardware component MAC address, a CPU serial number, a RAM part number, a monitor serial number, a Domain Name System (DNS) server identifier, a Dynamic Host Configuration Protocol (DHCP) server identifier, a static IP address, and a universally unique identifier (UUID).

12. A computer-readable storage device having instructions stored thereon for detecting nonlegitimate communications in a private cloud platform, wherein execution of the instructions by one or more processors causes the processors to:
establish a security signature service on the private cloud platform;
receive, at the security signature service, a calculated signature from a security control entity on a public cloud platform;
verify the calculated signature against a signature table on the private cloud platform;
if the calculated signature is verified, then:
send a request associated with the calculated signature to a target service on the private cloud platform;
receive a response to the request;
send the response to the security control entity on the public cloud platform; and
wherein if the calculated signature cannot be verified against the signature table on the private cloud platform, then send an indication to the security control entity that the request is from an unauthorized service.

13. The computer-readable storage device of claim 12, wherein the calculated signature is received at the security signature service only if the calculated signature has been verified against a signature table on the public cloud platform.

* * * * *